(12) United States Patent
Kasahara

(10) Patent No.: US 9,001,038 B2
(45) Date of Patent: Apr. 7, 2015

(54) INFORMATION DISPLAY APPARATUS, INFORMATION DISPLAY METHOD AND PROGRAM

(75) Inventor: Shunichi Kasahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 553 days.

(21) Appl. No.: 12/871,469

(22) Filed: Aug. 30, 2010

(65) Prior Publication Data

US 2011/0057880 A1  Mar. 10, 2011

(30) Foreign Application Priority Data

Sep. 7, 2009  (JP) ................................. 2009-205998

(51) Int. Cl.
   *G09G 5/08* (2006.01)
   *G06T 15/00* (2011.01)
   *G06F 3/0485* (2013.01)
   *G06F 1/16* (2006.01)
   *G06F 3/01* (2006.01)
   *G06F 3/0488* (2013.01)

(52) U.S. Cl.
   CPC ............ *G06F 3/0485* (2013.01); *G06F 1/1626* (2013.01); *G06F 1/1694* (2013.01); *G06F 3/017* (2013.01); *G06F 3/0488* (2013.01); *G06F 2200/1637* (2013.01)

(58) Field of Classification Search
   USPC .................................. 345/419, 179, 175, 158
   See application file for complete search history.

(56) References Cited

U.S. PATENT DOCUMENTS

| 7,822,443 | B2 * | 10/2010 | Kim et al. ...................... 455/566 |
| 2005/0111736 | A1 * | 5/2005 | Hullender et al. ............ 382/188 |
| 2007/0002018 | A1 | 1/2007 | Mori |
| 2008/0048997 | A1 * | 2/2008 | Gillespie et al. .............. 345/174 |
| 2009/0201270 | A1 | 8/2009 | Pikkujamsa et al. |
| 2009/0284463 | A1 * | 11/2009 | Morimoto et al. ............ 345/156 |
| 2011/0057957 | A1 * | 3/2011 | Kasahara ...................... 345/684 |

FOREIGN PATENT DOCUMENTS

JP   2007-280461   * 10/2007   ............. G11B 27/10

OTHER PUBLICATIONS

Harrison et al., Squeeze Me, Hold Me, Tilt Me! an Exploration of Manipulative User Interfaces. CHI. Apr. 1998;98:18-23.

* cited by examiner

*Primary Examiner* — Michael Faragalla
(74) *Attorney, Agent, or Firm* — Wolf, Greenfield & Sacks, P.C.

(57) ABSTRACT

An information display apparatus including: a tilt detection unit that detects a basic position of a casing and detects a tilt from the basic position of the casing; a display unit that is mounted on the casing and displays information on a display screen; a touch detection unit that is mounted on the casing and detects a touch of an operating body on the casing; and a control unit that after movement of information displayed on the display screen of the display unit is started based on the tilt of the casing detected by the tilt detection unit and when a touch of an operating body is detected by the touch detection unit, stops the movement of the information displayed on the display screen.

11 Claims, 16 Drawing Sheets

FIG. 16
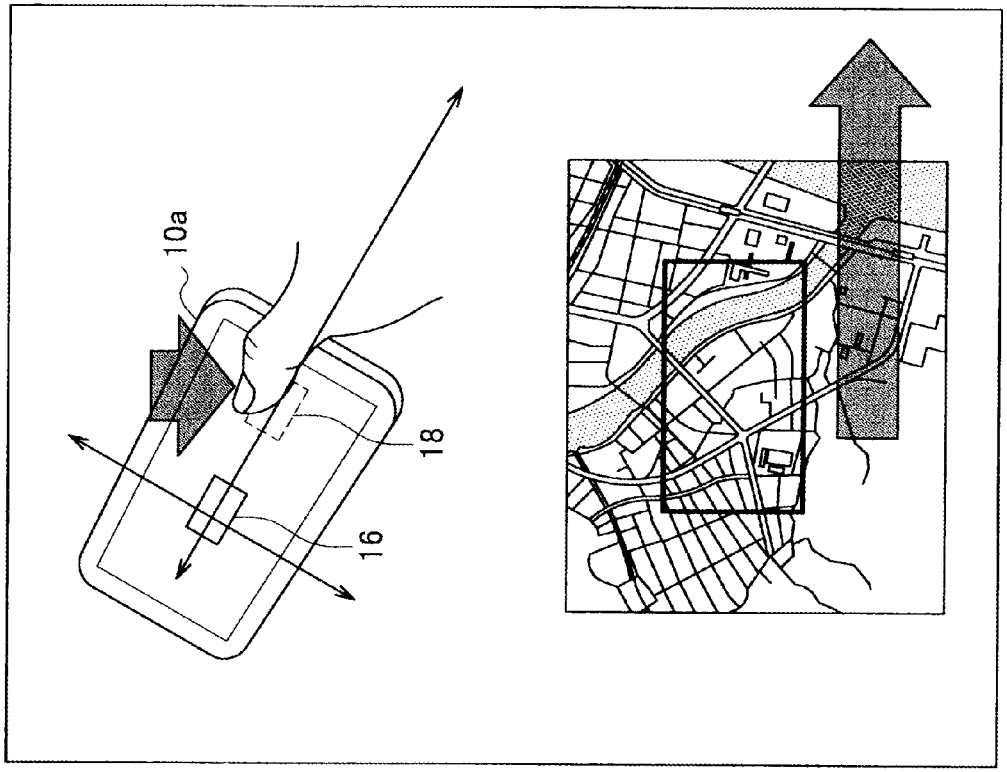
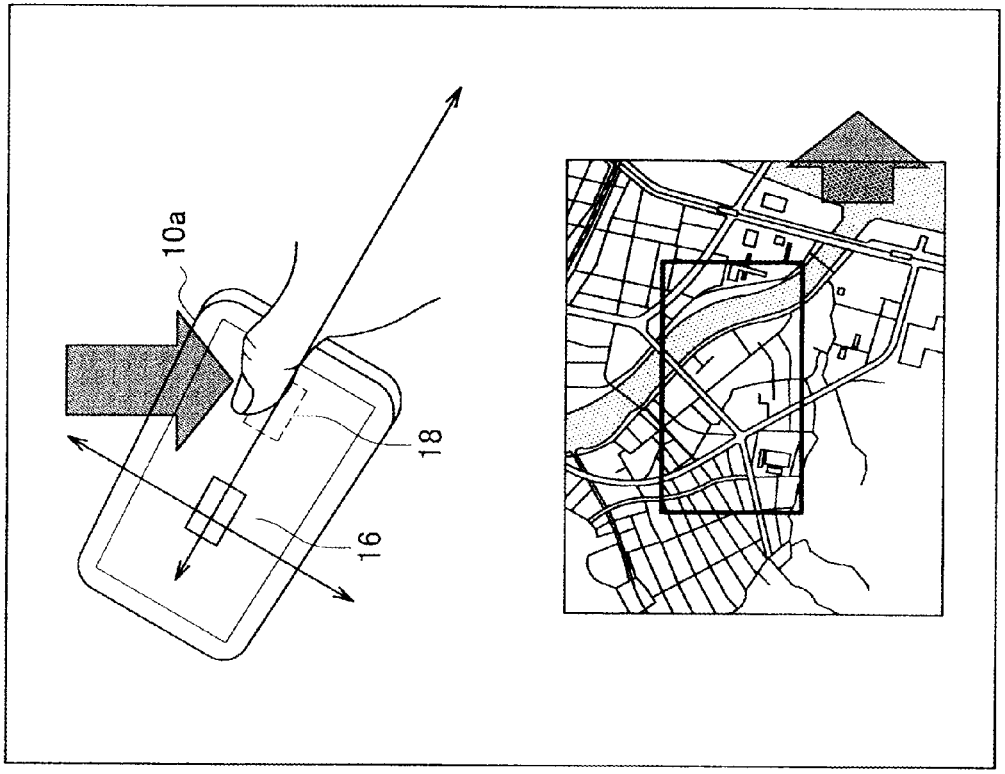

INFORMATION DISPLAY APPARATUS, INFORMATION DISPLAY METHOD AND PROGRAM

BACKGROUND OF THE INVENTION

1. Field of the Invention

The present invention relates to an information display apparatus, an information display method and a program.

2. Description of the Related Art

When scrolling a contents list or a map displayed on a display screen of a device, a user instructs the device to conduct a screen operation such as scrolling by various kinds of input operation means. On the device, a hardware button is mounted or a software button is displayed using graphic user interface (GUI). A user performs an input operation through such a button mainly with use of a finger. The screen operation using GUI enables direct operation, and a user-friendly input operation method has been proposed in this point.

Further, a device using information such as a tilt angle or a rotation angle detected by an acceleration sensor or the like has been also proposed. For example, an apparatus that detects the tilt angle of the apparatus body and controls cursor movement or scrolling on a contents list according to a detection result has been proposed in Japanese Unexamined Patent Application Publication No. 2007-280461. This eliminates the need for performing a physical key operation or the like, thereby reducing a burden when a user performs an input operation.

SUMMARY OF THE INVENTION

However, the hardware keyboard often forces complicated button operations, and there is a lack of portability. Further, the software keyboard takes up a space for display of virtual buttons and causes a strain on a free display area on the screen. Furthermore, when a user performs an input operation by a drug operation or a flick operation on a touch panel, the user needs to move the finger many times for browsing many items, which is a burden to the user. In addition, at the time of picture taking or the like, a user needs to carry out an operation with one hand holding the device, which further increases a burden to the user.

On the other hand, if the tilt of the apparatus body is detected by the acceleration sensor or the like and cursor movement or scrolling on a contents list is controlled based on the detection, although a basic motion can be controlled, fine adjustment when screening screen information is difficult, and it takes an unexpectedly long time until information desired by a user is displayed.

In light of the foregoing, it is desirable to provide a novel and improved information display apparatus, information display method and program that offer high usability with a low burden of input operations by combination of the tilt of the apparatus body and a GUI operation.

According to an embodiment of the present invention, there is provided an information display apparatus including: a tilt detection unit that detects a basic position of a casing and detects a tilt from the basic position of the casing; a display unit that is mounted on the casing and displays information on a display screen; a touch detection unit that is mounted on the casing and detects a touch of an operating body on the casing; and a control unit that after movement of information displayed on the display screen of the display unit is started based on the tilt of the casing detected by the tilt detection unit and when a touch of an operating body is detected by the touch detection unit, stops the movement of the information displayed on the display screen.

In this configuration, movement of information displayed on the display screen of the display unit is started based on the tilt of the casing, and, when a touch of the operating body on the display screen is detected after that, movement of the information displayed on the display screen is stopped. It is thereby possible to control display of the information display apparatus by the tilting operation of the casing and the touching operation of the operating body on the display screen. In this manner, by combining the tilt of the casing and the GUI operation by a user, the user can make browsing without complicated operations, so that the user can access desired information in a short time.

The control unit seamlessly may make a transition of control from a mode that moves information displayed on the display screen to a mode that drugs the information, triggered by the touch of the operating body detected by the touch detection unit.

The control unit may start movement of information displayed on the display screen at any time point when a given motion of the operating body is detected by the touch detection unit, when a shaking motion of the casing is detected by the tilt detection unit, or when a touching motion on given display on the display screen is detected by the touch detection unit.

The control unit may make base adjustment of a moving speed of information displayed on the display screen based on the tilt detected by the tilt detection unit and further makes adjustment of the moving speed based on a given operation of the operating body detected by the touch detection unit.

The control unit may control a moving speed of information displayed on the display screen by using the detected tilt and a given coefficient of static friction at start of movement of the information, and controls the moving speed of the information by using the detected tilt and a given coefficient of dynamic friction after a lapse of a predetermined time period from the start of movement of the information.

According to another embodiment of the present invention, there is provided an information display apparatus including: a tilt detection unit that detects a basic position of a casing and detects a tilt from the basic position of the casing; a display unit that is mounted on the casing and displays information on a display screen; a touch detection unit that is mounted on the casing and detects a touch of an operating body on the casing; a pressure detection unit that is mounted on the casing and detects a pressure value of an operating body on the casing; and a control unit that after movement of information displayed on the display screen of the display unit is started based on the tilt of the casing detected by the tilt detection unit and when the pressure value detected by the pressure detection unit reaches a predetermined value or greater, stops the movement of the information displayed on the display screen.

The control unit may make base adjustment of a moving speed of information displayed on the display screen based on the tilt detected by the tilt detection unit and further makes adjustment of the moving speed based on the pressure value detected by the pressure detection unit.

According to another embodiment of the present invention, there is provided an information display method comprising the steps of: detecting a basic position of a casing and detecting a tilt from the basic position of the casing; displaying information on a display screen of a display unit mounted on the casing; detecting a touch of an operating body on the display screen; and after movement of information displayed on the display screen is started based on the tilt of the casing detected in the step of detecting a tilt and when a touch of an operating body is detected in the step of detecting a touch, stopping the movement of the information displayed on the display screen.

According to another embodiment of the present invention, there is provided a program causing a computer to execute a process comprising processing of: detecting a basic position of a casing and detecting a tilt from the basic position of the casing; displaying information on a display screen of a display unit mounted on the casing; detecting a touch of an operating body on the display screen; and after movement of information displayed on the display screen is started based on the tilt of the casing detected in the processing of detecting a tilt, and, when a touch of an operating body is detected in the processing of detecting a touch, stopping the movement of the information displayed on the display screen.

According to the embodiments of the present invention described above, it is possible that a user can make browsing without complicated operations by combination of the tilt of the casing 10a and the screen operation such as clicking on the display.

BRIEF DESCRIPTION OF THE DRAWINGS

FIG. 16 is a view showing an example of a scrolling method of the mobile device according to the third embodiment.

DETAILED DESCRIPTION OF THE EMBODIMENT(S)

Figure 1:
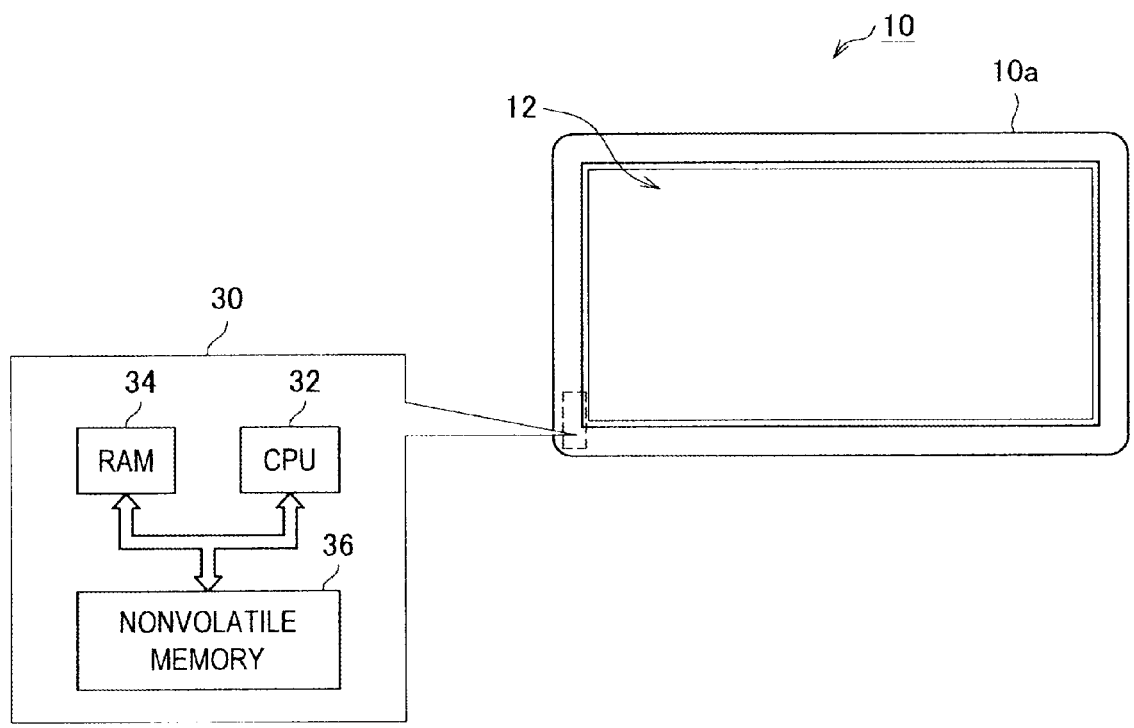
FIG. 1 is a view showing a mobile device according to the first to third embodiments of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The embodiments of the present invention will be described in the following order.

<First Embodiment>
[1-1. Hardware Configuration of Mobile Device]
[1-2. Functional Configuration of Mobile Device]
[1-3. Operation of Mobile Device]
(Display Process)
<Second Embodiment>
[2-1. Operation of Mobile Device]
(Display Process)
<Third Embodiment>
[3-1. Hardware Configuration of Mobile Device]
[3-2. Functional Configuration of Mobile Device]
[3-3. Operation of Mobile Device]
(Display Process)

FIRST EMBODIMENT 1-1. Hardware Configuration of Mobile Device

An overview of a hardware configuration of a mobile device according to a first embodiment of the present invention is described hereinafter with reference to FIGS. 1 and 2.

Referring to FIG. 1, a mobile device 10 according to the embodiment has a display 12 that fits into a groove that is cut into the center of a casing 10a. As the display 12, a liquid crystal display (LCD), an organic electroluminescence display (OELD) or the like may be used.

The mobile device 10 according to the embodiment is an example of an information display apparatus that controls movement of information such as scrolling by detecting the tilt of the casing 10a and a touch of a finger on the display 12. The information display apparatus may be a cellular phone, a portable music player, a mobile information terminal (personal digital assistant (PDA)), a camera or the like. The information display apparatus displays information such as a web browser, a photo viewer, a moving picture and a map.

Figure 2:
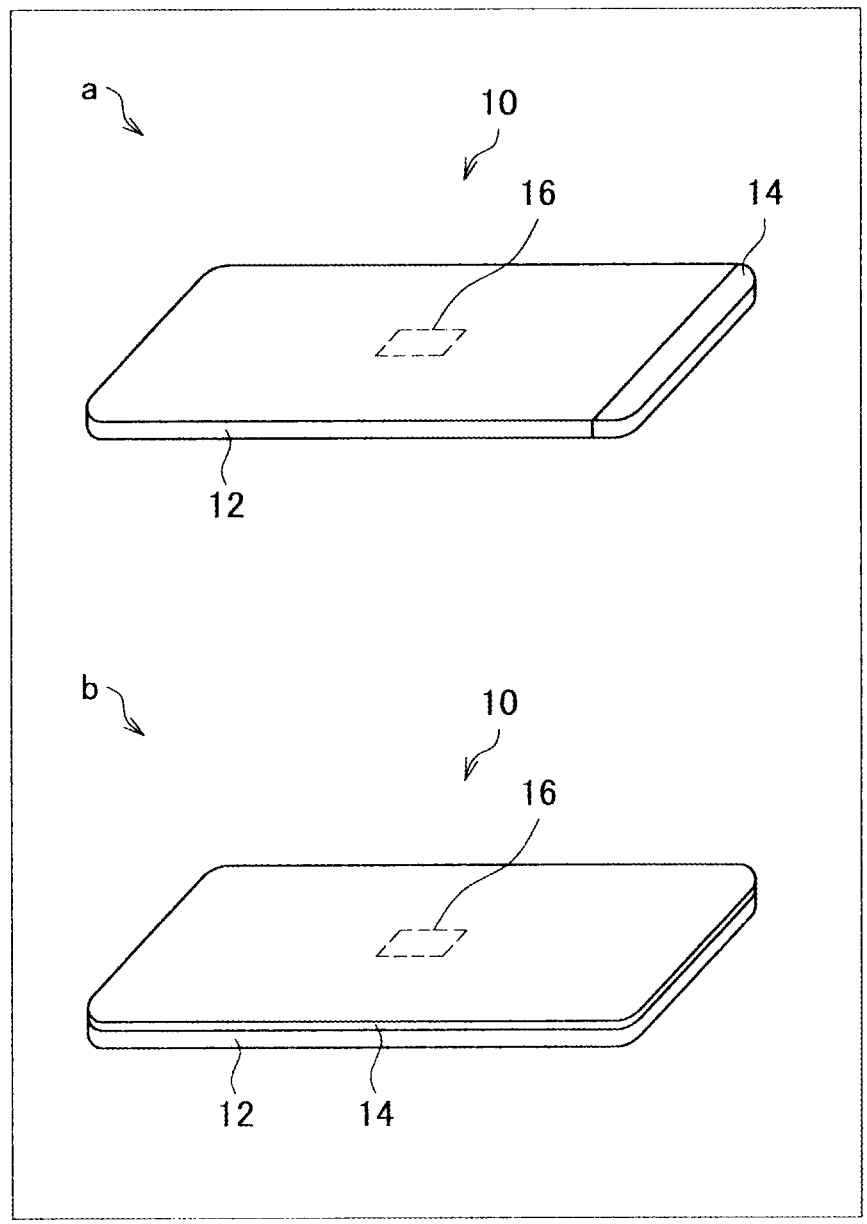
FIG. 2 is a view showing a touch panel and an acceleration sensor mounted on the mobile device according to the first and second embodiments.

As shown at the top "a" of FIG. 2, the mobile device 10 according to the embodiment has a long slender touch panel 14 that is mounted on one side surface of the display 12. The touch panel 14 may be a sheet member that is placed all over the display surface of the display 12 as shown at the bottom "b" of FIG. 2. The touch panel 14 may be an electrostatic or optical panel as long as it is a transmission type. In this embodiment, the touch panel 14 has an electrostatic sensor arranged like a lattice and detects the position (coordinates) of an operating body such as a finger touching the display surface depending on a change in capacitance. When the touch panel 14 detects no change in capacitance, it is determined that a finger is not touching the display surface of the display 12. When the touch panel 14 detects a change in capacitance, it is determined that a finger is touching the display surface of the display 12. It is thereby possible to detect a given input operation such as a touching motion, a flick motion or a drug motion by a user's finger.

Figure 3:
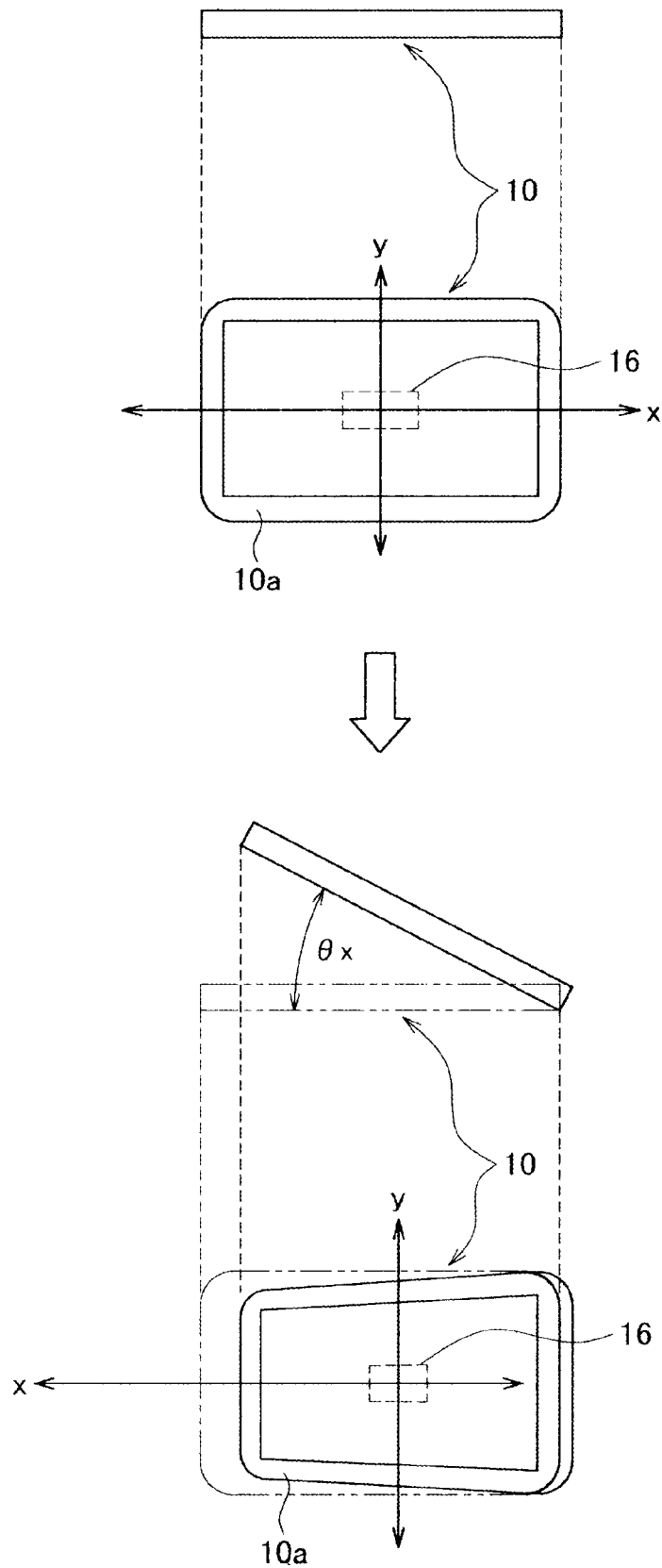
FIG. 3 is a view to describe a relationship between the tilt of the mobile device and detection of the acceleration sensor according to the first to third embodiments.

A 2-axis acceleration sensor 16 is mounted at the center of the mobile device 10. Although one acceleration sensor 16 is placed in this example, acceleration sensors may be mounted at four corners of the casing 10a, for example. As shown in FIG. 3, the acceleration sensor 16 detects accelerations with respect to two axes, i.e. the x-axis and the y-axis respectively indicating the horizontal axis and the vertical axis, of the display surface of the display 12 of the casing 10a.

The accelerations in the x-axis and y-axis directions detected by the acceleration sensor 16 and the touch position detected by the touch panel 14 are transmitted as a sensor signal to a microprocessor 30 of FIG. 1 that is incorporated into the mobile device 10. The microprocessor 30 includes a CPU 32, RAM 34 and nonvolatile memory 36. The detected accelerations and touch position are stored in the RAM 34 or the nonvolatile memory 36 of the microprocessor 30. The CPU 32 calculates tilt angles in the x-axis direction and the y-axis direction with respect to a reference plane of a basic position of the casing 10a based on the 2-axis accelerations stored in the memory. Assume, for example, that the posture of the mobile device 10 shown at the top of FIG. 3 is the basic position, and the x-axis and the y-axis which are set in this posture are basic. When, as shown at the bottom of FIG. 3, the mobile device 10 is tilted to the left in the x-axis direction and not tilted in the y-axis direction, the CPU 32 calculates $\theta_x$ and $\theta_y$ (=0) as the tilt angles along the x-axis and the y-axis with respect to the basic position. The tilts of the mobile device 10 in the x-direction and the y-direction can be obtained from the tilt angles $\theta_x$ and $\theta_y$. The CPU 32 calculates a scrolling speed from the tilt angles $\theta_x$ and $\theta_y$.

Further, the CPU 32 associates the touch position and display contents displayed on the display 12 and thereby analyzes the finger motion. The CPU 32 performs a prescribed input operation to the mobile device 10 based on the analyzed finger motion.

Note that, although an operating body is actually touching the surface of the touch panel 14, not touching the display surface of the display 12, such a state is also described as "the operating body is touching the display surface of the display 12".

1-2. Functional Configuration of Mobile Device

Figure 4:
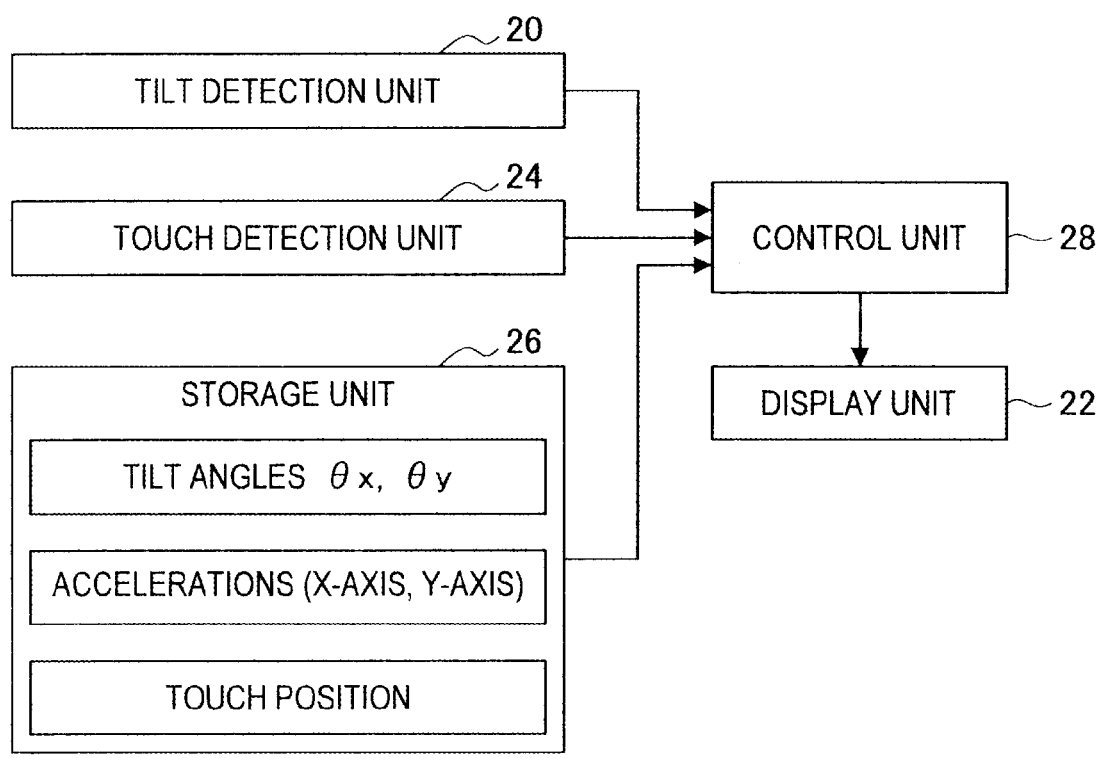
FIG. 4 is a view showing a functional block according to the first and second embodiments.

The mobile device 10 according to the first embodiment has a functional configuration shown in the functional block of FIG. 4. Specifically, the mobile device 10 according to the embodiment includes a tilt detection unit 20, a display unit 22, a touch detection unit 24, a storage unit 26 and a control unit 28.

The tilt detection unit 20 detects the basic position of the casing 10a of the mobile device 10 and detects tilts from the basic position. In this embodiment, the tilt detection unit 20 calculates the tilt angle $\theta_x$ of the casing 10a in the x-axis direction and the tilt angle $\theta_y$ of the casing 10a in the y-axis direction based on the accelerations along the x-axis and the y-axis which are detected by the acceleration sensor 16.

The display unit 22 is mounted on the casing 10a and displays information such as a contents list, a map and a photograph on the display screen.

The touch detection unit 24 detects a finger's touch state on the display screen based on a change in capacitance by the touch panel 14.

The storage unit 26 temporarily stores 2-axis accelerations, tilt angles $\theta_x$ and $\theta_y$, and a touch position.

The control unit 28 starts movement of information displayed on the display screen based on the tilts of the casing 10a detected by the tilt detection unit 20 and, when a touch of an operating body is detected by the touch detection unit 24, stops movement of the information displayed on the display screen.

The control unit 28 makes base adjustment of the moving speed of information displayed on the display screen based on the tilts detected by the tilt detection unit 20 and further makes fine adjustment of the moving speed based on the given operation of the operating body detected by the touch detection unit 24.

Commands to the respective units described above are executed by a dedicated control device or the CPU 32 that executes a program. Programs for executing a display process, which is described later, is prestored in the RAM 34 or the nonvolatile memory 36, and the CPU 32 reads and executes each program from such memory to thereby implement the functions of the control unit 28.

1-3. Operation of Mobile Device

Figure 5:
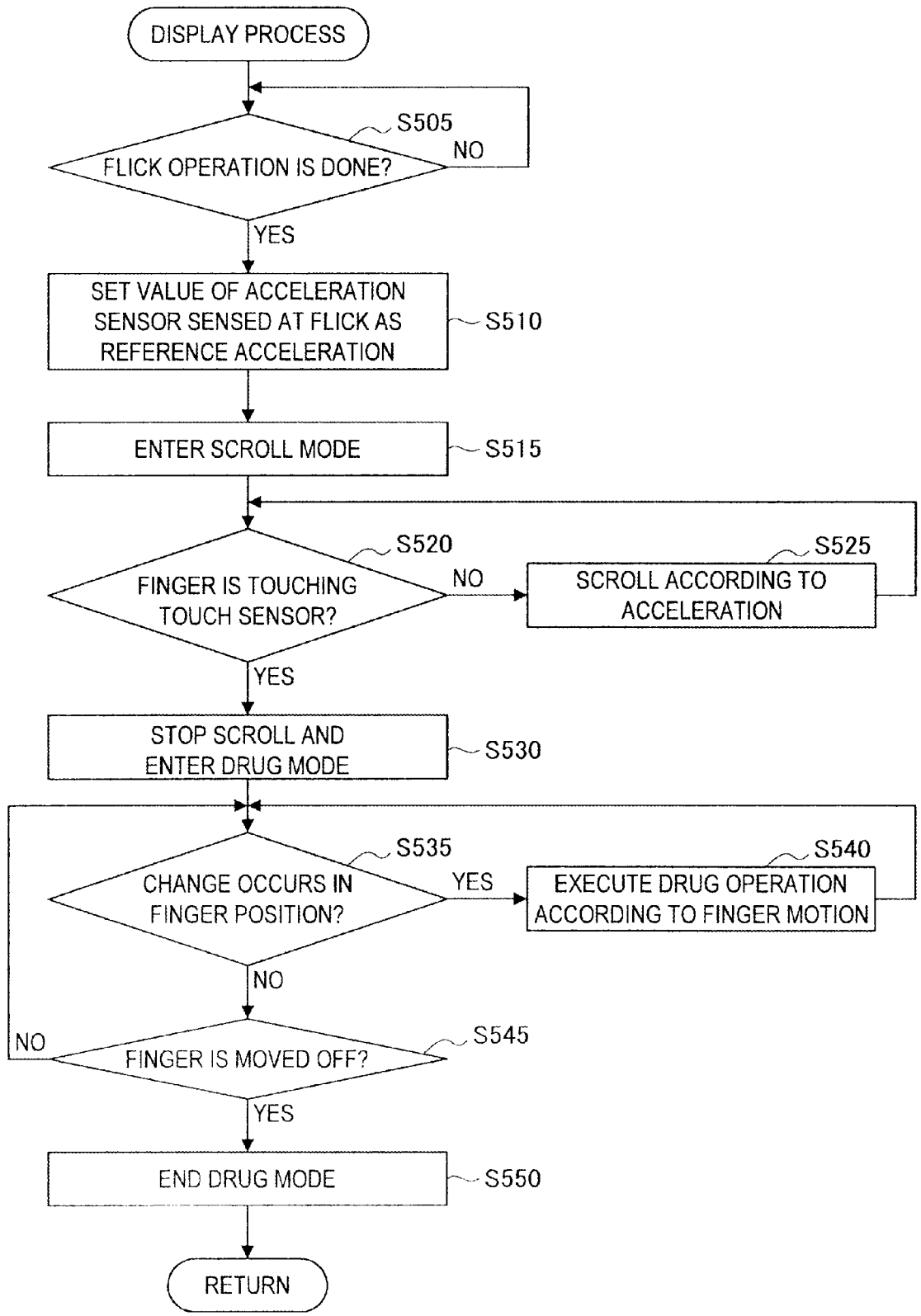
FIG. 5 is a flowchart showing a display process executed in the mobile device according to the first embodiment.

The operation of the mobile device according to the embodiment is described hereinafter with reference to the flowchart of a display process shown in FIG. 5.
(Display Process)

After the display process according to the embodiment is started, the touch detection unit 24 determines whether a flick motion is done based on the touch state of the touch panel 14 in the step S505. The control unit 28 repeats the determination processing in the step S505 until a flick motion is done, and, upon detecting a flick motion, it starts movement of information displayed on the display screen and enters a scroll mode.

Figure 6:
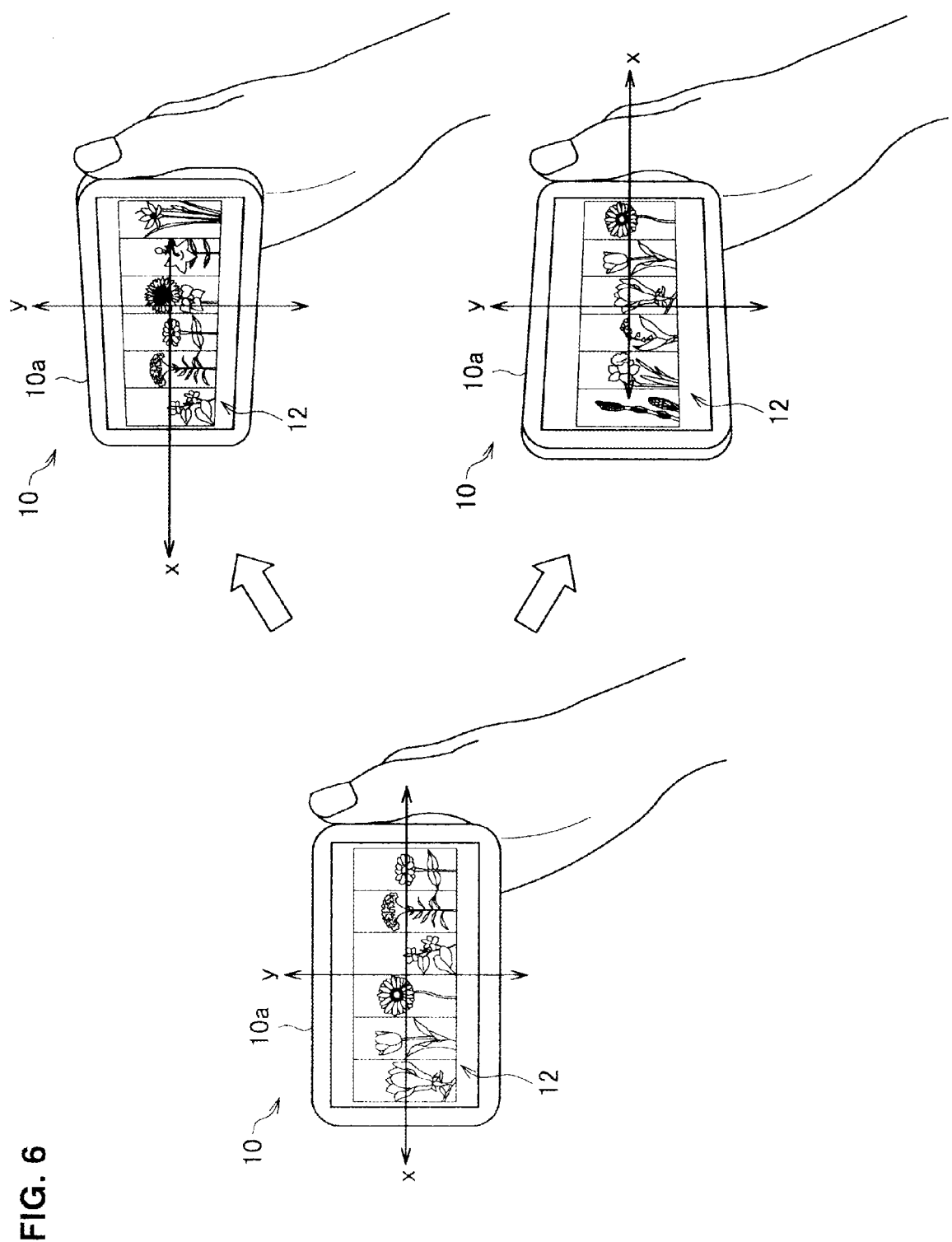
FIG. 6 is a view to describe a basic position of the mobile device according to the first to third embodiments.

In the step S510, the control unit 28 sets sensed values of the acceleration sensor 16 that are sensed at the time of the flick motion as reference accelerations. Specifically, when a flick is detected, the posture of the device at that moment is set as a basic position, and the accelerations in this posture are detected as the reference accelerations. For example, in the mobile device 10 shown at the left of FIG. 6, the posture where the casing 10a faces straight front is the basic position, and sensed values along the x-axis and the y-axis in this posture are set as the reference accelerations. On the other hand, in the mobile device 10 at the upper right of FIG. 6, the casing 10a is tilted to the left. If a flick motion is detected in this state, sensed values along the x-axis and the y-axis in the tilted posture are set as the reference accelerations. In the mobile device 10 at the lower right of FIG. 6 also, sensed values along the x-axis and the y-axis in the posture where the casing 10a is tilted to the right are set as the reference accelerations.

In the step S515, the control unit 28 enters control in the scroll mode that moves information displayed on the display screen. In the step S520, the touch detection unit 24 determines whether a finger is touching the touch panel 14. When a finger is not touching the touch panel 14, in the step S525, the tilt detection unit 20 obtains displacements of the accelerations detected by the acceleration sensor 16 from the reference accelerations, calculates the tilts (tilt angles $\theta_x$ and $\theta_y$) of the casing 10a from the displacements, and determines the speed of scrolling according to the calculated tilts. The scrolling speed may be calculated directly from the displacements of the accelerations. The control unit 28 scrolls screen information at the determined speed. The processing of the step S520 and the step S525 is repeated until a finger touches the touch panel 14.

Figure 7:
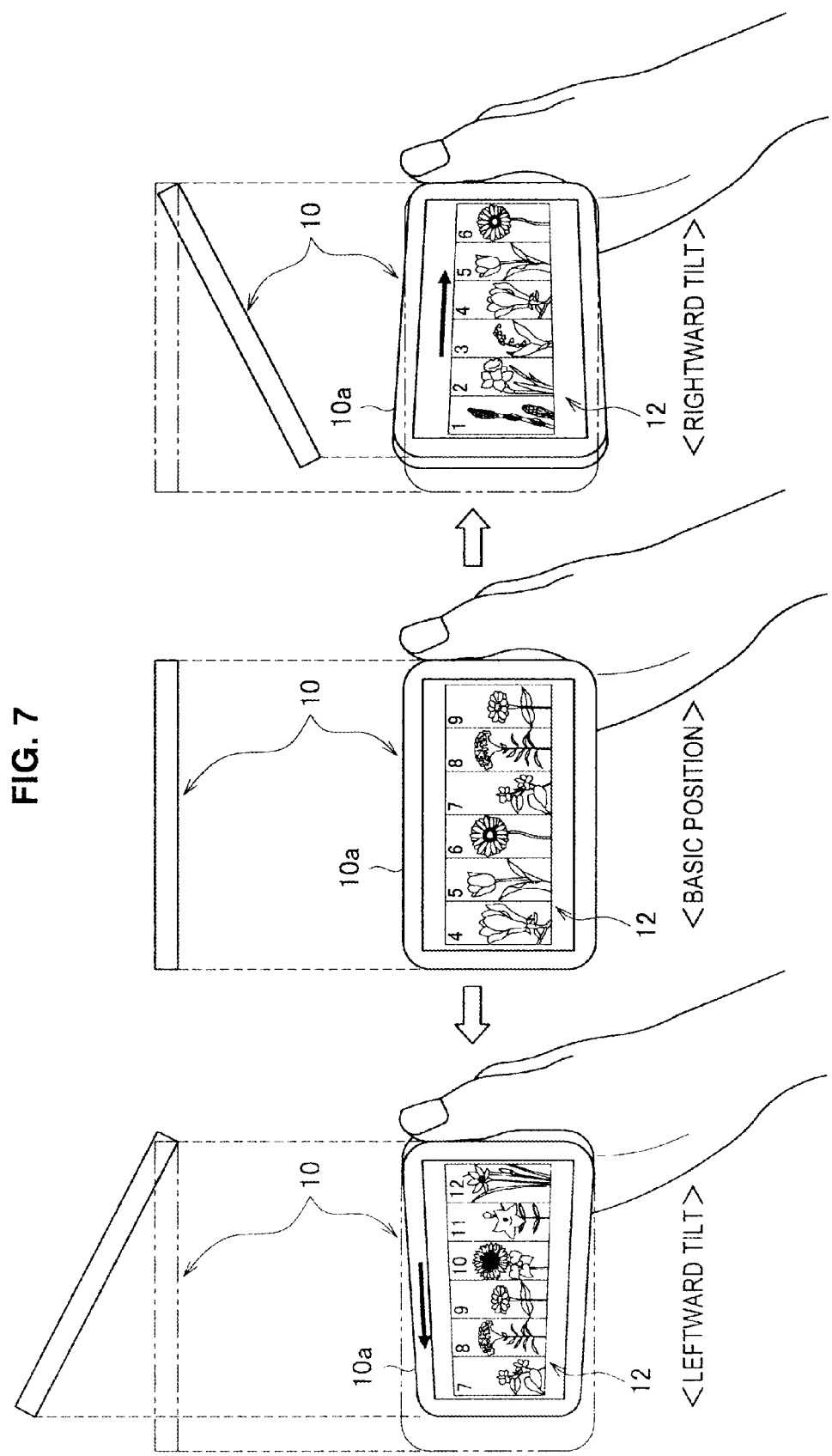
FIG. 7 is a view to describe a relationship between a tilt direction and a scrolling direction in the mobile device according to the first embodiment.

In this process, as shown in FIG. 7, when the casing 10a is tilted to the right as shown at the right with respect to the basic position shown at the center, pictures displayed on the screen are scrolled from the left to the right at a speed corresponding to the magnitude of the tilt. On the other hand, when the casing 10a is tilted to the left as shown at the left, the pictures displayed are scrolled from the right to the left at a speed corresponding to the magnitude of the tilt.

The target to be scrolled is accelerated depending on the tilt of the casing 10a as a model having a certain amount of mass.

The speed of scrolling may be controlled by using a coefficient of dynamic friction or a coefficient of static friction as a model. Specifically, at the start of scrolling shown at the center of FIG. 7, for example, the control unit 28 calculates a scrolling speed by using the detected tilt of the casing 10a and a given coefficient of static friction. After the lapse of a given time period from the start of scrolling, in the state shown at the right or left of FIG. 7, the control unit 28 calculates a scrolling speed by using the detected tilt and a given coefficient of dynamic friction. Control is thereby made so that a great force is necessary for scrolling an image at the start of motion by an operation that largely tilts the casing 10a, and only a small force is necessary for scrolling once put into motion. This allows a user to make a more intuitive operation.

Figure 8:
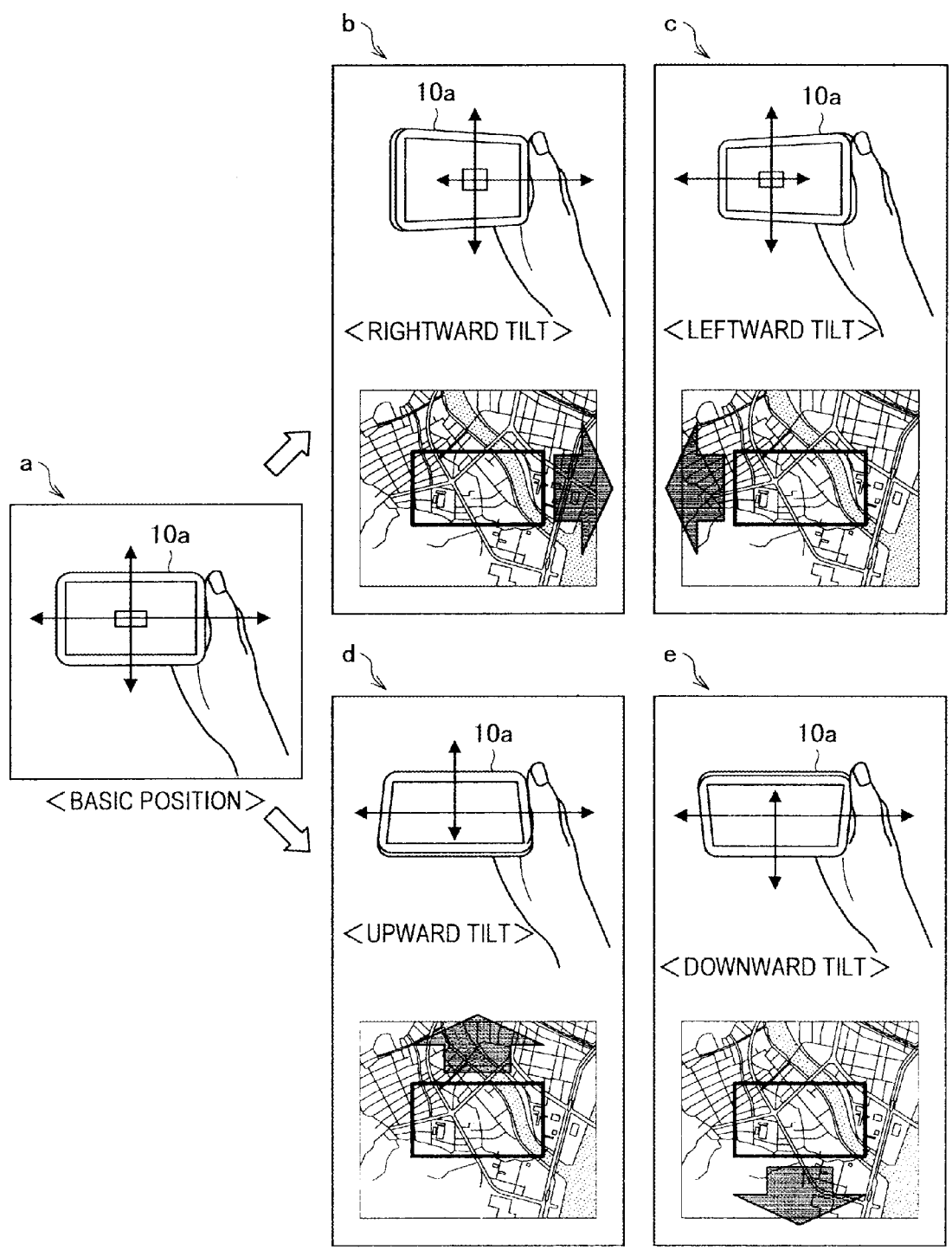
FIG. 8 is a view to describe a scroll motion according to the first embodiment.

Scrolling of a map shown in FIG. 8 is also described. The left "a" of FIG. 8 shows the basic position. With respect to the basic position, if the casing 10a is tilted to the right as shown at the upper center "b" of FIG. 8, the map is scrolled rightward. If the casing 10a is tilted to the left as shown at the upper right "c" of FIG. 8, the map is scrolled leftward. If the casing 10a is tilted to the up side as shown at the lower center "d" of FIG. 8, the map is scrolled upward. If the casing 10a is tilted to the down side as shown at the lower right "e" of FIG. 8, the map is scrolled downward. In this manner, the mobile device 10 according to the embodiment enables an intuitive scrolling operation by tilting the casing 10a without causing an operating burden to a user.

In the scroll mode, it is monitored whether a finger touches the touch panel 14, and if a finger touches the touch panel 14, the process proceeds from the step S520 to the step S530, and the control unit 28 stops scrolling and enters a drug mode. In the step S535, the touch detection unit 24 detects whether a change occurs in finger position. When there is a change in finger position, in the step S540, the control unit 28 executes a drug operation according to the finger motion. Thus, after the device enters the drug mode, by continuously moving the finger (S535), fine adjustment of browsing can be made (S540).

Even if the touch detection unit 24 determines in the step S535 that there is no change in finger position, while the touch detection unit 24 detects that the finger is touching the touch panel 14, the processing of the steps S535 to S545 is repeated. On the other hand, when the touch detection unit 24 determines in the step S535 that there is no change in finger position and further determines in the step S545 that the finger is moved off the touch panel 14 and becomes a non-touch state, the process proceeds to the step S550, and the control unit 28 ends the drug mode.

Figure 9:
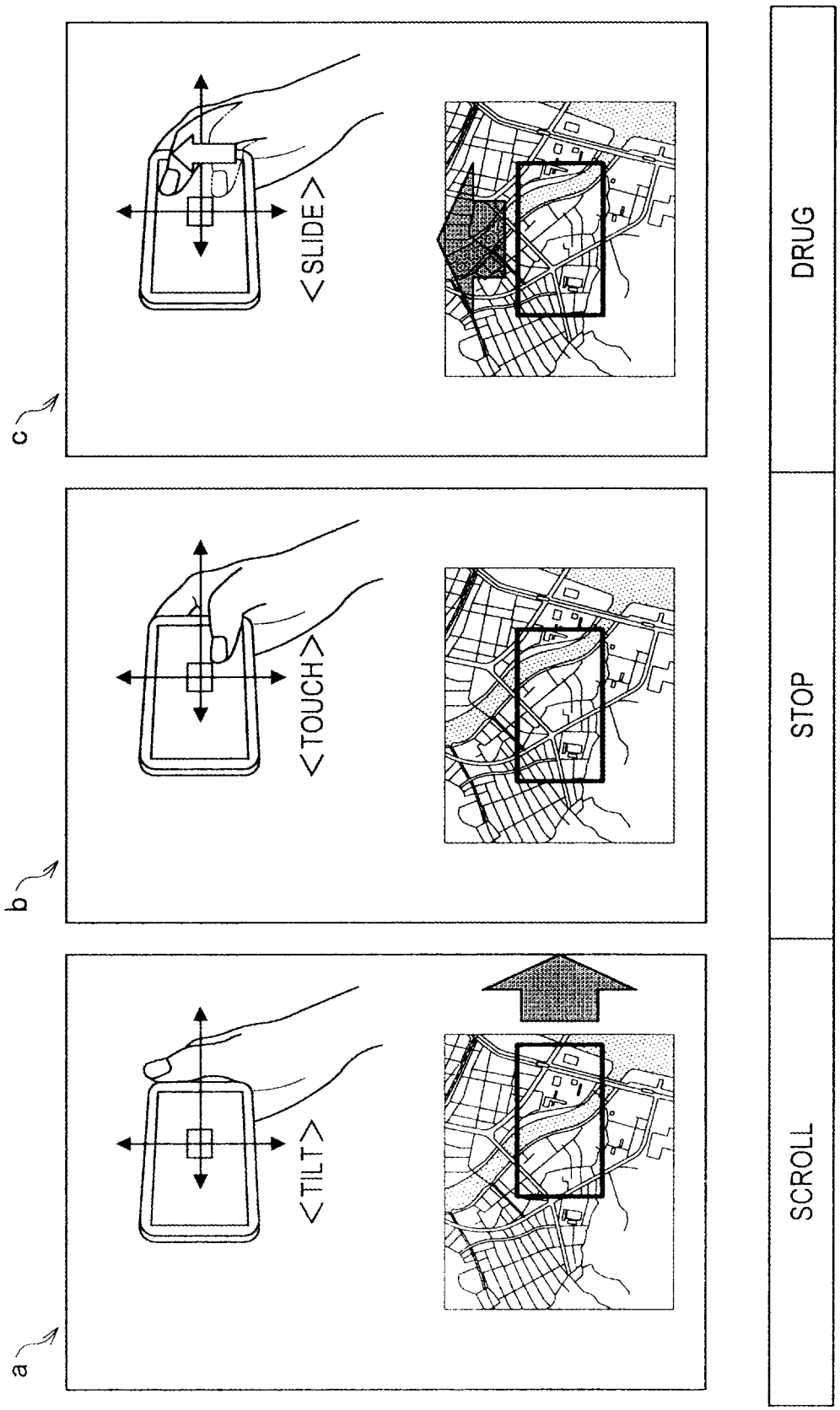
FIG. 9 is a view to describe a scroll motion, a stop motion and a drug motion according to the first embodiment.

In this process, as shown in the transition from the scroll mode to the drug mode in FIG. 9, triggered by a touch of a finger on the display screen shown at the center "b" of FIG. 9, the control unit 28 can seamlessly make a transition from the mode that scrolls information displayed on the display screen by tilting the casing 10a as shown at the left "a" of FIG. 9 to the mode that drugs the information by sliding the finger as shown at the right "c" of FIG. 9.

As described above, in the mobile device 10 according to the embodiment, scrolling is started based on a flick motion, information is scrolled at a speed corresponding to the tilt of the casing 10a, and scrolling is stopped upon a touch of a finger on the display screen. For example, when information desired by a user is not being displayed, base adjustment such as scrolling of the screen is performed by tilting the casing 10a. After the information desired by the user is displayed, scrolling of information displayed on the display screen is stopped, a seamless transition is made from the scroll mode to the drug mode, and fine adjustment of the display screen is performed by a GUI operation or the like. In this manner, a user can make browsing without complicated operations by combination of the tilt of the casing 10a and the screen operation. For example, it is possible to obtain desired information in a short time by an intuitive operation such as scrolling a contents list, changing a parameter or scrolling a map by tilting the casing 10a so as to go down in the tilted direction. Further, by associating the tilt direction of the mobile device 10 and the behavior of graphics, a user can easily recognize an operating method. Furthermore, even under circumstances where it is hard to use a hand or a finger, a user can scroll information simply by tilting the casing 10a.

Further, in the mobile device 10 according to the embodiment, it is basically not necessary to display a software or hardware operation button for scrolling or movement. Therefore, a display space of the display screen is not limited, and it is thus possible to provide the mobile device 10 with a simplified appearance and an easily viewable display to a user.

Although the scroll mode is triggered by a flick motion in the above description, it may be triggered by another action. For example, in all the embodiments, scrolling of information displayed on the display screen may be started at the time point when a shaking motion of the casing 10a by a finger, such as an extreme change in acceleration value in a short time, is detected by the tilt detection unit 20 or when a touching motion on given display such as a clasp displayed on the display screen (an unclasping motion etc.) is detected by the touch detection unit 24.

Figure 10:
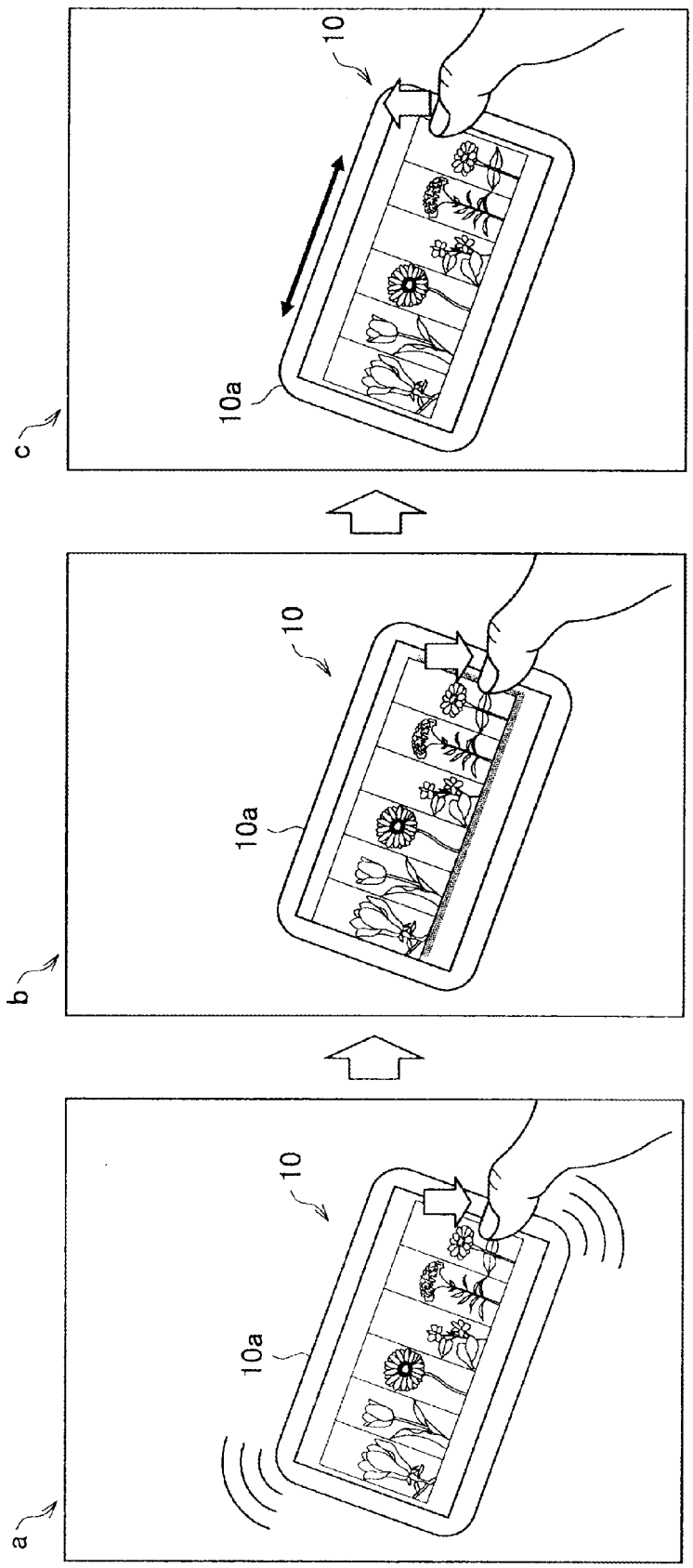
FIG. 10 is a view to describe an example of a scrolling method of the mobile device according to the first embodiment.

For example, by shaking the casing 10a as shown at the left "a" of FIG. 10, representation of a contents list is changed, thereby prompting a user to introduce the scroll mode. One example of a change in representation of a contents list is representation in which a contents list appears floating as shown at the center "b" of FIG. 10. After changing to such representation, when a finger is moved off the display in a given length of time as shown at the right "c" of FIG. 10, scrolling is started. Note that, when a finger is not moved off the display in a given length of time after changing to the above representation, introduction to the scroll mode is rejected. The contents list then returns to normal display.

Figure 11:
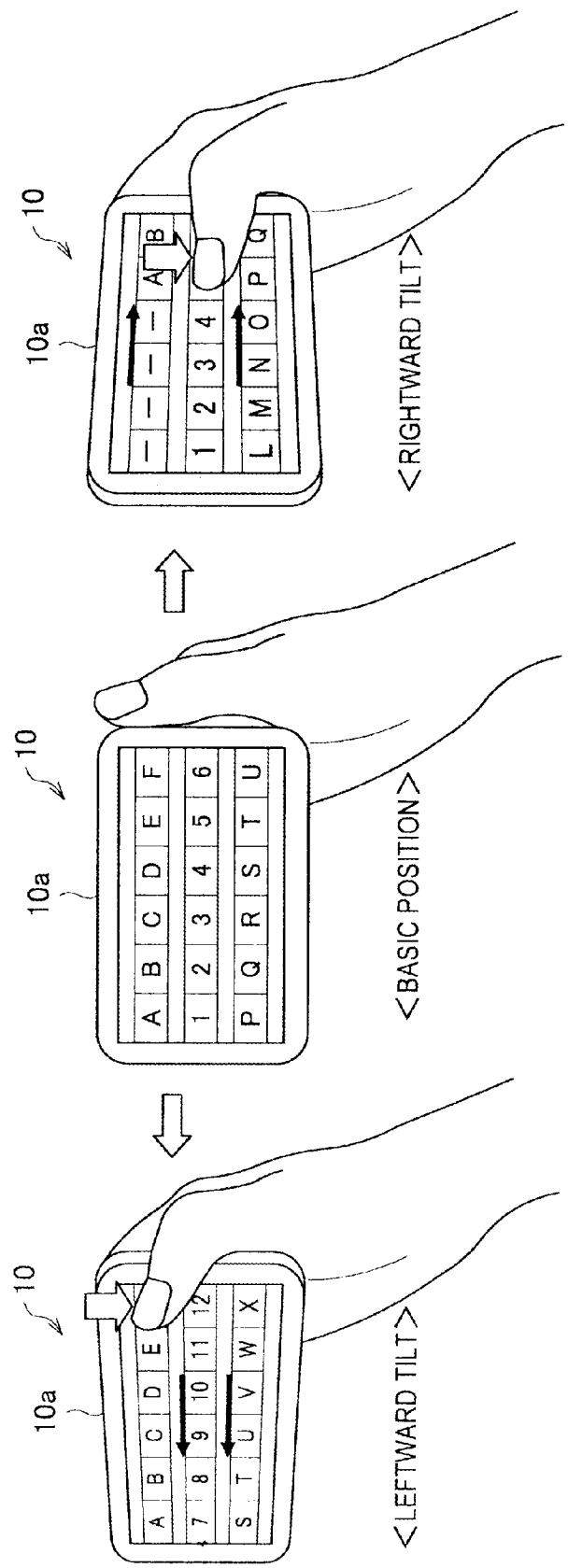
FIG. 11 is a view to describe an example of a scrolling method of the mobile device according to the first embodiment.

As another example of a scrolling method, in the case where a plurality of band-like contents are displayed as shown in FIG. 11, from the basic position shown at the center of FIG. 11, if the casing 10a is tilted to the right with the middle band-like contents being held down by a finger as shown at the right of FIG. 11, only the upper and lower band-like contents, which are not held down, are scrolled from the left to the right. Likewise, if the casing 10a is tilted to the left with the upper band-like contents being held down by a finger as shown at the left of FIG. 11, only the middle and lower band-like contents, which are not held down, are scrolled from the right to the left.

SECOND EMBODIMENT

Figure 12:
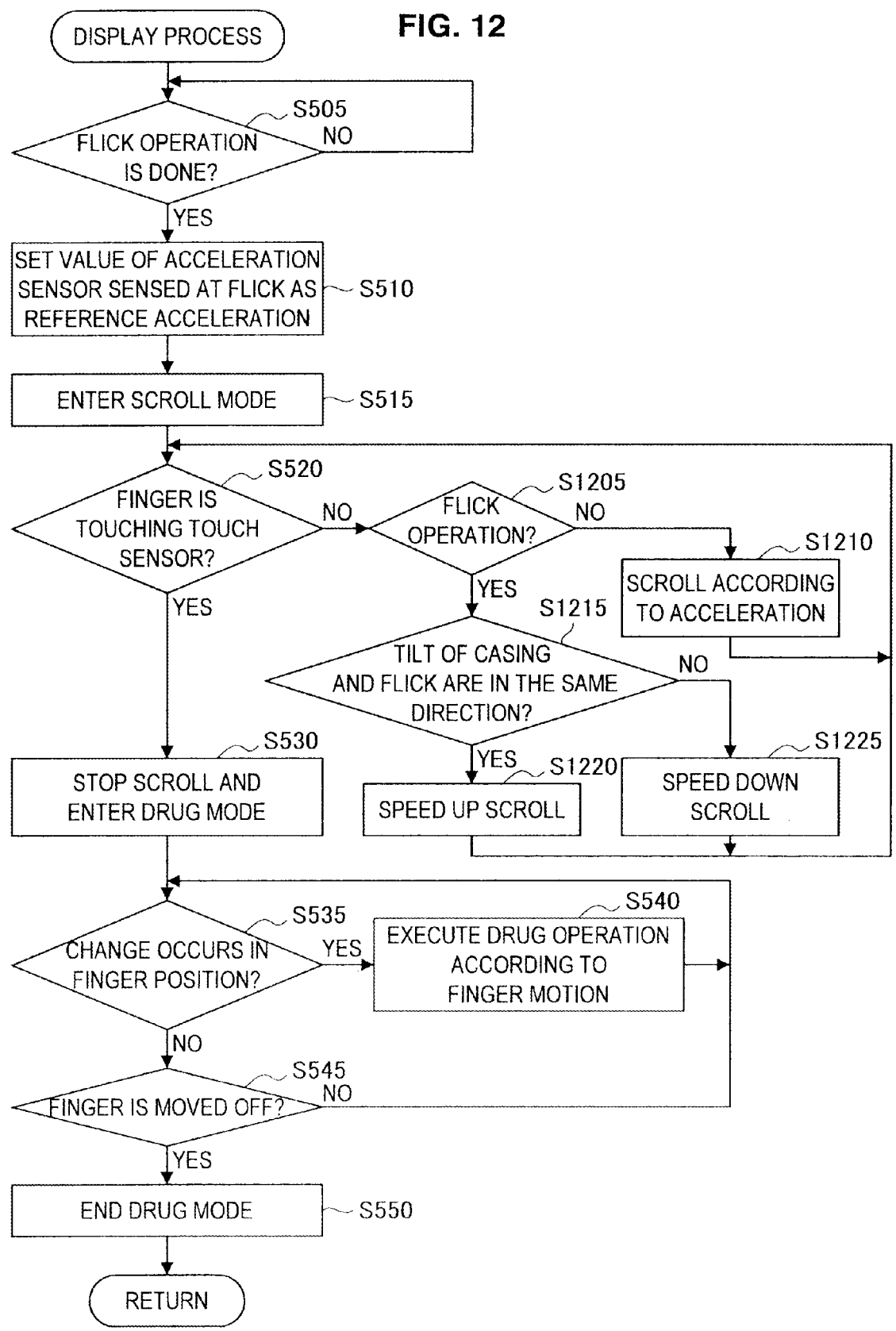
FIG. 12 is a flowchart showing a display process executed in the mobile device according to the second embodiment.
Figure 13:
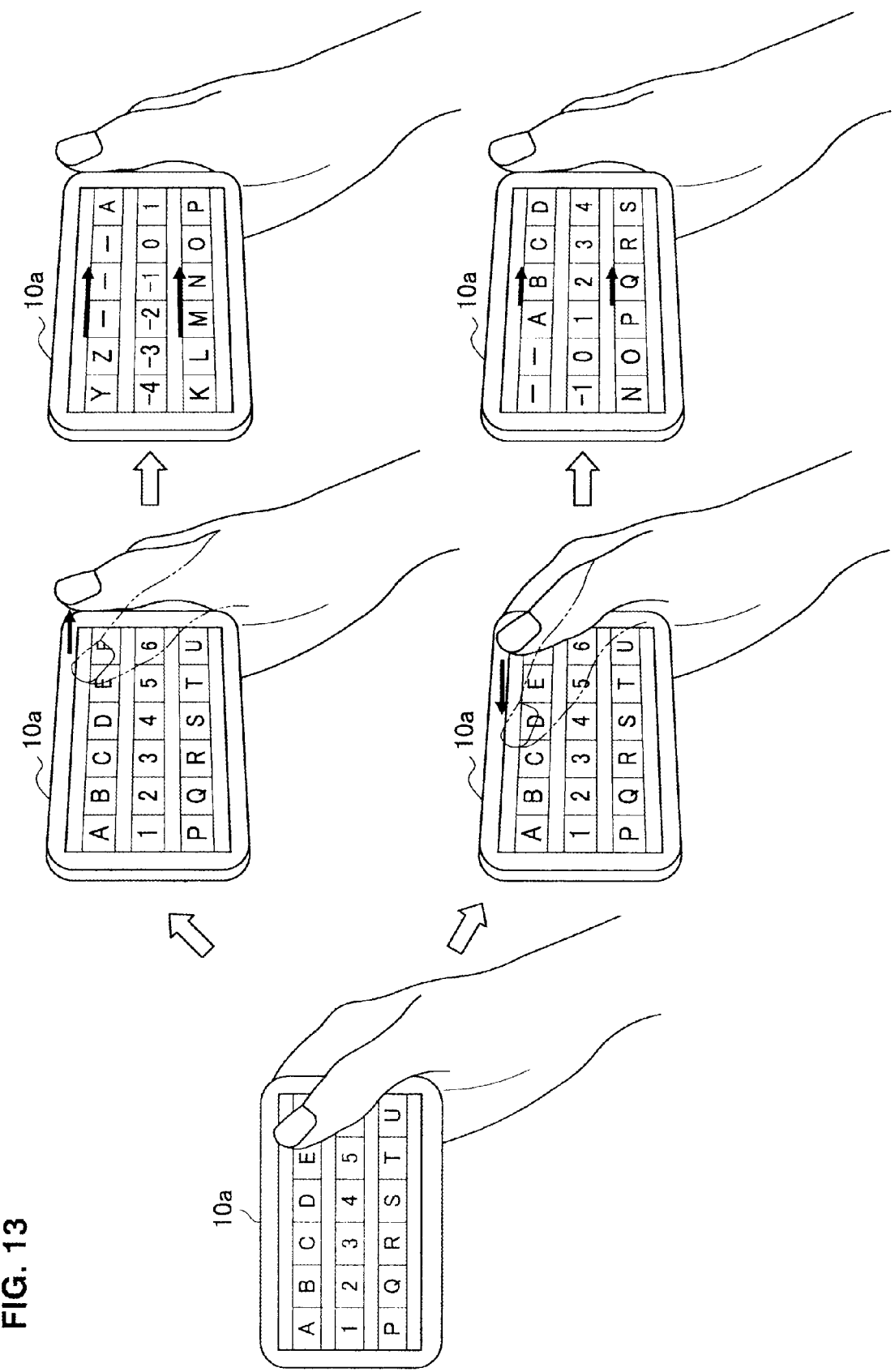
FIG. 13 is a view to describe an example of a scrolling method of the mobile device according to the second embodiment.

A mobile device 10 according to a second embodiment of the present invention is described hereinafter with reference to FIGS. 12 and 13.

The control unit 28 according to the second embodiment roughly controls the speed of scrolling information displayed on the display screen based on the tilt detected by the tilt detection unit 20 and further finely controls the scrolling speed based on the magnitude and the direction of a finger's flick motion detected by the touch detection unit 24. Focusing on this point, the operation of the mobile device 10 is described hereinafter with reference to the flowchart of a display process shown in FIG. 12.

2-1. Operation of Mobile Device (Display Process)

After the display process according to the embodiment is started, the processing of the steps S505 to S515 is performed in the same manner as in the first embodiment, and it enters the scroll mode. In the step S520, the touch detection unit 24 determines whether a finger is touching the touch panel 14. When a finger is not touching the touch panel 14, the control unit 28 determines whether a flick motion is done in the step S1205. When it is determined that a flick motion is not performed, the control unit 28 scrolls the screen at a speed corresponding to the sensed values (accelerations) in the step S1210. On the other hand, when it is determined in the step S1205 that a flick motion is performed, the process proceeds to the step S1215, and the control unit 28 determines whether the tilt of the casing 10a and the direction of the flick are in the same direction. If the screen is flicked in the same direction as the tilt of the casing 10a as shown at the upper center of FIG. 13, the control unit 28 controls the scroll to be more likely to accelerate in the step S1220. If, on the other hand, the screen is flicked in a different direction from the tilt of the casing 10a as shown at the lower center of FIG. 13, the control unit 28 controls the scroll to be less likely to accelerate in the step S1225. The above-described processing of the step S520 and the steps S1205 to S1225 is repeated until a finger touches the touch panel 14.

When it is determined in the step S520 that a finger touches the touch panel 14, the control unit 28 stops scrolling and enters the drug mode in the step S530. The processing up to the end of the drug mode (the steps S535 to S550) is the same as that in the first embodiment, and an explanation thereof is omitted.

In the case of executing scrolling of a screen or movement of an image with a virtual button or a hardware button displayed on the screen, it has been hitherto necessary to show the state of those operations in graphics. Thus, it has been sometimes difficult to understand which of a user's view point or a contents list is moved in a scrolling or paging operation. On the other hand, in the operation according to the embodiment, by use of a physical matter move, i.e. the tilt of the casing 10a, it is easy to associate a user's operation and a screen motion, thereby enabling a more intuitive operation. For example, the scrolling speed can be controlled by a gesture operation such as flicking. This enables reduction of an operating burden during scrolling.

THIRD EMBODIMENT

A mobile device 10 according to a third embodiment of the present invention is described hereinafter with reference to FIGS. 14 to 16.

3-1. Hardware Configuration of Mobile Device

In the mobile device 10 according to the embodiment, the touch panel 14 and the acceleration sensor 16 are mounted on the display 12, as in the first embodiment. In addition, a pressure sensor, which is not shown, is mounted on the mobile device 10 according to the embodiment. The pressure sensor has a structure in which an elastic body is held by two electrodes, and it detects a change in distance between the electrodes which occurs due to deformation of the elastic body caused by finger's pressing the touch panel as a change in capacitance.

3-2. Functional Configuration of Mobile Device

Figure 14:
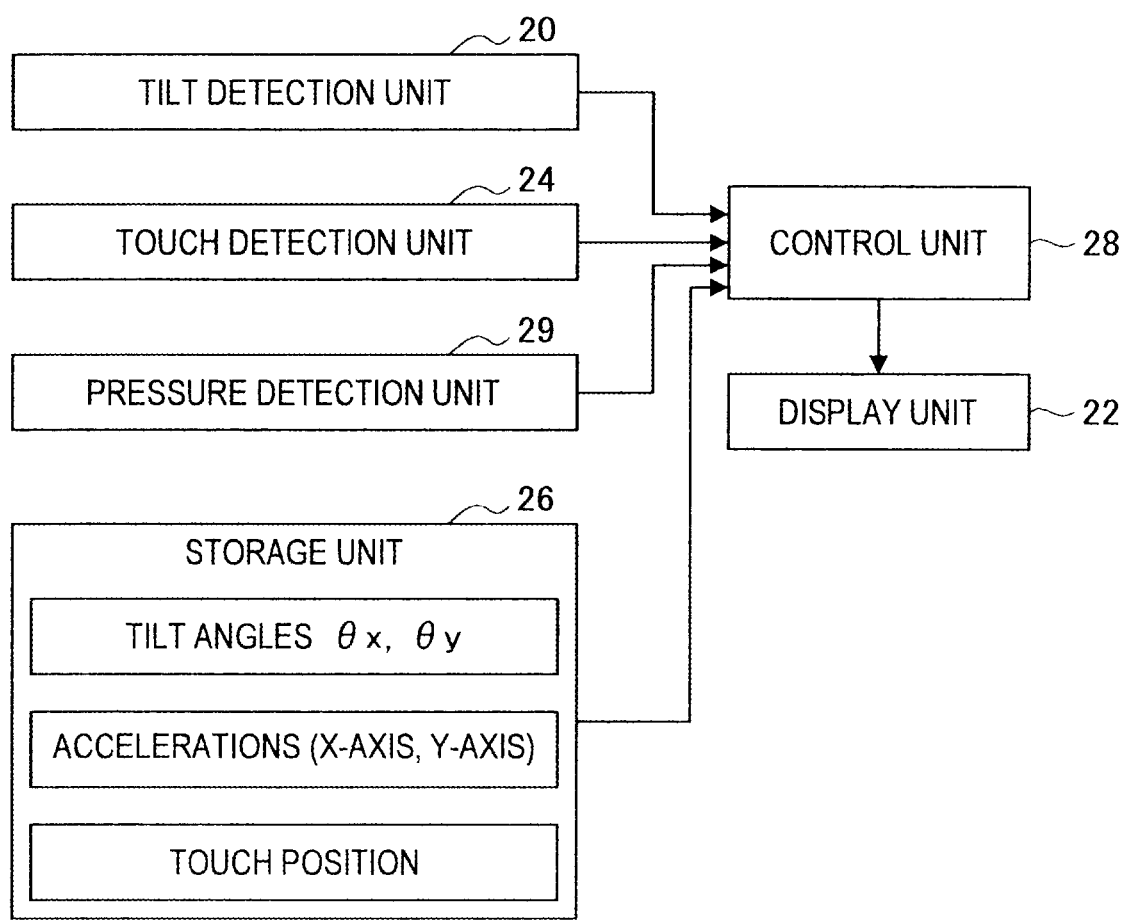
FIG. 14 is a view showing a functional block according to the third embodiment.
Figure 15:
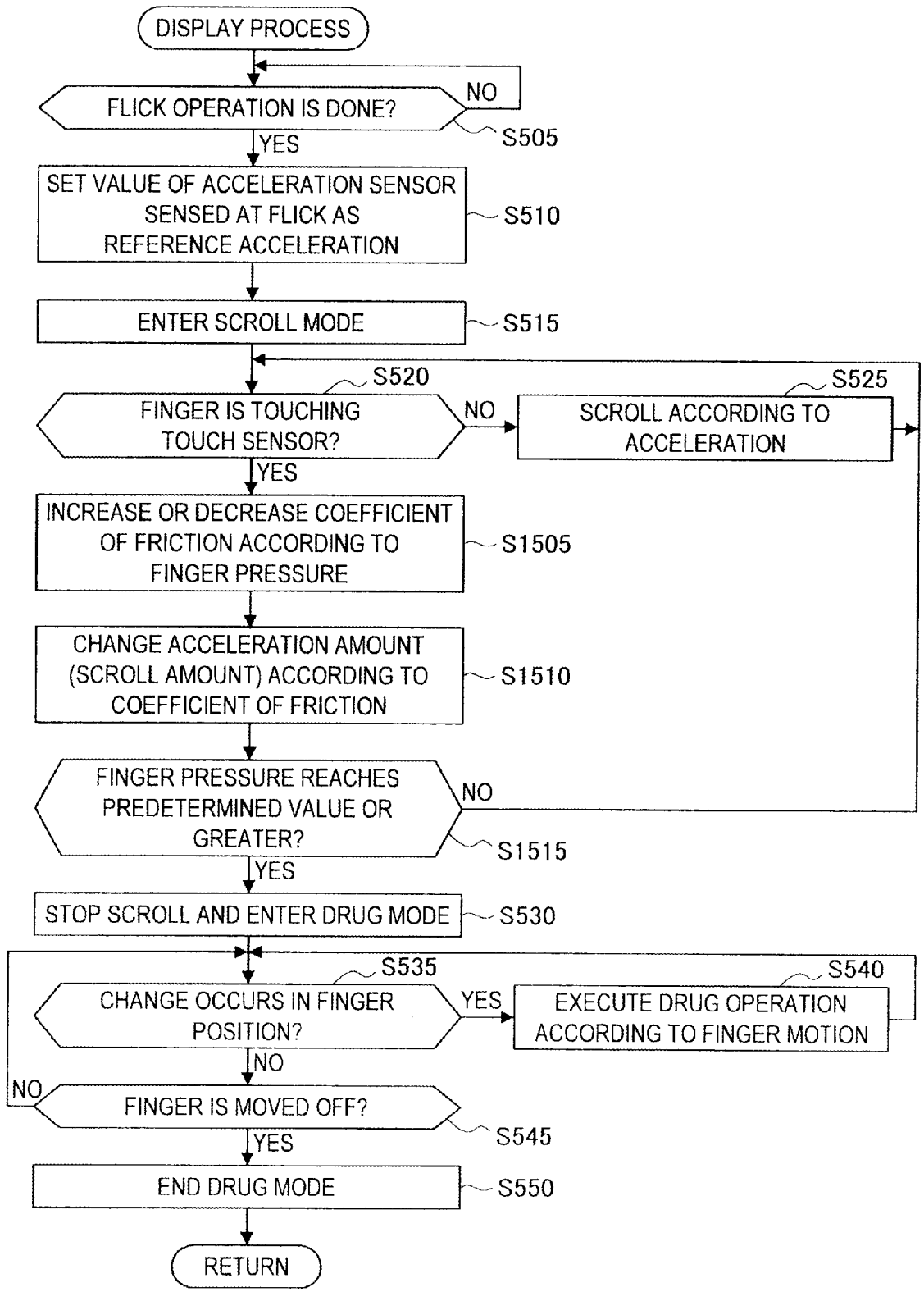
FIG. 15 is a flowchart showing a display process executed in the mobile device according to the third embodiment.

The mobile device 10 according to the embodiment has a functional configuration shown in FIG. 14. Specifically, the mobile device 10 according to the embodiment includes a pressure detection unit 29 in addition to the configuration of the mobile device 10 according to the first embodiment. The pressure detection unit 29 is mounted on the display screen of the display unit 22 and detects a pressure value of an operating body on the display screen. The control unit 28 makes base adjustment of the moving speed of information displayed on the display screen based on the tilts detected by the tilt detection unit 20 and further makes fine adjustment of the moving speed based on the pressure value detected by the pressure detection unit 29.

3-3. Operation of Mobile Device

The operation of the mobile device according to the embodiment is described hereinafter with reference to the flowchart of a display process shown in FIG. 15.

(Display Process)

After the display process according to the embodiment is started, scrolling according to the tilt (acceleration) of the casing 10a is executed in the steps S505 to S525 as in the first embodiment. When it is determined in the step S520 that a finger touches the touch panel 14, the control unit 28 increases or decreases a coefficient of friction according to the pressure value of the finger detected by the pressure detection unit 29 in the step S1505, and changes an acceleration amount (scroll amount) according to the coefficient of friction in the step S1510. Then, in the step S1515, the control unit 28 determines whether a finger pressure reaches a predetermined value or greater. When it does not yet reaches the predetermined value, the process returns to the step S520 and repeats the processing of the steps S520, S525, S1505 and S1510. When the control unit 28 determines in the step S1515 that a finger pressure reaches the predetermined value or greater, the control unit 28 stops scrolling and enters the drug mode in the step S530. The processing up to the end of the drug mode (the steps S535 to S550) is the same as that in the first embodiment, and an explanation thereof is omitted.

By the above operation, if a user presses the casing 10a with a finger as shown at the right "b" of FIG. 16 from the state where the finger is off the casing 10a as shown at the left "a" of FIG. 16, the pressure sensor 18 is deformed and detects the press. The pressure detection unit 29 calculates a pressure value based on the sensed value sensed by the pressure sensor 18. In this embodiment, the coefficient of friction is increased or decreased according to the pressure value, and the user can thereby change the acceleration amount (scroll amount) simply by adjusting a force to press the finger against the casing 10a.

For example, if a finger is pressed firmly down, deformation of the pressure sensor 18 becomes larger, and a pressure value detected by the pressure detection unit 29 increases accordingly. When the pressure value is larger than a predetermined value, the control unit 28 sets a coefficient of static friction or a large coefficient of friction. Thus, the scroll is less likely to accelerate when a finger is pressed firmly down.

On the other hand, if the pressing down of a finger is weakened, deformation of the pressure sensor 18 becomes smaller, and a pressure value detected by the pressure detection unit 29 decreases accordingly. The control unit 28 sets a smaller coefficient of friction as the pressure value is smaller. Thus, the scroll is more likely to accelerate when the pressing down of a finger is weakened.

The control unit 28 may of course control the scroll to be more likely to accelerate when the pressing down of a finger is strengthened and to be less likely to accelerate when the pressing down of a finger is weakened, differently from the above-described control method.

According to the embodiment, it is possible to make fine adjustment of the scrolling speed by changing a finger's pressing operation. This enables reduction of an operating burden during scrolling. Further, it is easy to associate a user's operation and a screen motion, thereby enabling a more intuitive operation. Specifically, when not scrolling, a behavior is consistent with a coefficient of static friction at the start of motion, so that it is difficult to set into motion when held strongly and easy to set into motion when held lightly. It is thereby possible to perform a scrolling operation of a screen only with a pressure to hold the screen without changing the posture of a hand or a finger.

In the first to third embodiments described above, the operations of the respective units are related to each other and may be replaced with a series of operations or a series of processing in consideration of the relation to each other. The embodiment of the information display apparatus can be thereby converted into an embodiment of an information display method and an embodiment of a program for causing a computer to implement the functions of the information display apparatus.

Therefore, there can be provided an information display method including the steps of detecting a basic position of a casing and detecting a tilt from the basic position of the casing, displaying information on a display screen of a display unit mounted on the casing, detecting a touch of an operating body on the display screen, and starting movement of information displayed on the display screen based on the tilt of the casing detected in the step of detecting a tilt, and, when a touch of an operating body is detected in the step of detecting a touch, stopping movement of the information displayed on the display screen.

Further, there can be also provided a program causing a computer to execute a process including processing of detecting a basic position of a casing and detecting a tilt from the basic position of the casing, displaying information on a display screen of a display unit mounted on the casing, detecting a touch of an operating body on the display screen, and starting movement of information displayed on the display screen based on the tilt of the casing detected in the processing of detecting a tilt, and, when a touch of an operating body is detected in the processing of detecting a touch, stopping movement of the information displayed on the display screen.

It should be understood by those skilled in the art that various modifications, combinations, sub-combinations and alterations may occur depending on design requirements and other factors insofar as they are within the scope of the appended claims or the equivalents thereof.

For example, although scrolling is described as an example of movement of information in the above embodiments, the present invention is not limited thereto. For example, information may be zoomed in or out as movement of information.

The present application contains subject matter related to that disclosed in Japanese Priority Patent Application JP 2009-205998 filed in the Japan Patent Office on Sep. 7, 2009, the entire content of which is hereby incorporated by reference.

What is claimed is:

1. An information display apparatus configured to display information in a plurality of modes comprising a scroll mode and a drag mode, the information display apparatus comprising:
    a tilt detection unit configured to detect a basic position of a casing and to detect a tilt from the basic position of the casing;
    a display unit, mounted on the casing, configured to display information on a display screen;
    a touch detection unit, mounted on the casing, configured to detect a touch of an operating body on the casing; and
    a control unit configured to:
        initiate presentation of the information in the scroll mode by starting movement of the information based at least in part on a flick motion detected by the touch detection unit and/or the tilt of the casing detected by the tilt detection unit; and
        in response to detecting the touch of the operating body on the casing when the information is being presented in the scroll mode:
            stop movement of the information displayed on the display screen, and
            initiate presentation of the information in the drag mode by causing the information displayed on the display screen to be dragged in accordance with a change in a position of the operating body, when the change in the position of the operating body is detected by the touch detection unit.

2. The information display apparatus according to claim 1, wherein:
    the control unit is configured to adjust a moving speed of the information displayed on the display screen based at least in part on the tilt detected by the tilt detection unit and adjust the moving speed based on an operation of the operating body detected by the touch detection unit.

3. The information display apparatus according to claim 1, wherein:
    the control unit is configured to control a moving speed of information displayed on the display screen by using the detected tilt and a coefficient of static friction at start of movement of the information, and is configured to control the moving speed of the information by using the detected tilt and a coefficient of dynamic friction after a lapse of a predetermined time period from the start of movement of the information.

4. An information display apparatus configured to display information in a plurality of modes comprising a scroll mode and a drag mode, the information display apparatus comprising:
    a tilt detection unit configured to detect a basic position of a casing and to detect a tilt from the basic position of the casing;
    a display unit, mounted on the casing, configured to display information on a display screen;
    a touch detection unit, mounted on the casing, configured to detect a touch of an operating body on the casing;
    a pressure detection unit, mounted on the casing, configured to detect a pressure value of an operating body on the casing; and
    a control unit configured to:
        initiate presentation of the information in the scroll mode by starting movement of the information based at least in part on a flick motion detected by the touch detection unit and/or the tilt of the casing detected by the tilt detection unit; and in response to detecting that the pressure value exceeds a predetermined threshold when the information is being presented in the scroll mode:
stop movement of the information displayed on the display screen, and
initiate presentation of the information in the drag mode by causing the information displayed on the display screen to be dragged in accordance with a change in a position of the operating body, when the change in the position of the operating body is detected by the touch detection unit.

5. The information display apparatus according to claim 4, wherein:
the control unit is configured to adjust a moving speed of the information displayed on the display screen based at least in part on the tilt detected by the tilt detection unit and further makes adjustment of the moving speed based on the pressure value detected by the pressure detection unit.

6. An information display method, comprising:
detecting a basic position of a casing and detecting a tilt from the basic position of the casing;
initiating presentation of information on a display screen of a display unit mounted on the casing in a scroll mode by starting movement of the information based at least in part on a flick motion and/or the tilt of the casing;
in response to detecting a touch of an operating body on the casing when the information is being presented in the scroll mode:
stopping the movement of the information displayed on the display screen; and
initiating presentation of the information in a drag mode by causing the information displayed on the display screen to be dragged in accordance with the change in the position of the operating body.

7. A computer memory storing a program, that when executed by a computer, causes the computer to execute a process comprising:
detecting a basic position of a casing and detecting a tilt from the basic position of the casing;
initiating presentation of information on a display screen of a display unit mounted on the casing in a scroll mode by starting movement of the information based at least in part on a flick motion and/or the tilt of the casing;
in response to detecting a touch of an operating body on the casing when the information is being presented in the scroll mode:
stopping the movement of the information displayed on the display screen; and
initiating presentation of the information in a drag mode by causing the information displayed on the display screen to be dragged in accordance with the change in the position of the operating body.

8. The information display apparatus of claim 1, wherein the operating body is a finger of a user.

9. The information display apparatus of claim 4, wherein the operating body is a finger of a user.

10. The method of claim 6, wherein the operating body is a finger of a user.

11. The method of claim 7, wherein the operating body is a finger of a user.

* * * * *